US010718988B2

(12) United States Patent  
Trajkovska-Broach et al.

(10) Patent No.: US 10,718,988 B2  
(45) Date of Patent: Jul. 21, 2020

(54) ELECTRO-CHROMIC DEVICES INCLUDING SOLID OR QUASI-SOLID ELECTROLYTE LAYERS AND METHODS OF MAKING THE SAME

(71) Applicant: E-Vision, LLC, Sarasota, FL (US)

(72) Inventors: Anita Trajkovska-Broach, Christiansburg, VA (US); William Kokonaski, Gig Harbor, WA (US)

(73) Assignee: e-Vision, LLC, Sarasota, FL (US)

( * ) Notice: Subject to any disclaimer, the term of this patent is extended or adjusted under 35 U.S.C. 154(b) by 0 days.

(21) Appl. No.: 14/171,285

(22) Filed: Feb. 3, 2014

(65) Prior Publication Data

US 2015/0219974 A1    Aug. 6, 2015

Related U.S. Application Data

(60) Provisional application No. 61/897,874, filed on Oct. 31, 2013, provisional application No. 61/760,440, filed on Feb. 4, 2013.

(51) Int. Cl.
*G02F 1/1523* (2019.01)
*G02F 1/15* (2019.01)

(52) U.S. Cl.
CPC ...... *G02F 1/1525* (2013.01); *G02F 2001/164* (2019.01); *Y10T 29/49885* (2015.01)

(58) Field of Classification Search
CPC .......... G02F 1/153; G02F 1/155; G02F 1/163; G02F 1/15; G02F 1/157; G02F 1/1523; G02F 1/1533; G02F 1/1525; G02F 1/1521

USPC ........................................ 359/265, 270, 275
See application file for complete search history.

(56) References Cited

U.S. PATENT DOCUMENTS

| | | | |
|---|---|---|---|
| 4,195,917 A | 4/1980 | Kuwagaki et al. | |
| 4,277,147 A | 7/1981 | Arnoldussen | |
| 4,573,768 A * | 3/1986 | Polak | G02F 1/1525 359/270 |
| 5,032,543 A | 7/1991 | Black et al. | |
| 5,206,756 A * | 4/1993 | Cheshire | 359/270 |

(Continued)

FOREIGN PATENT DOCUMENTS

| | | |
|---|---|---|
| EP | 1505680 A2 | 2/2005 |
| JP | 2000-509161 A | 7/2000 |

(Continued)

OTHER PUBLICATIONS

Notification of Transmittal of the International Search Report and the Written Opinion of the International Searching Authority, or the Declaration for International Application No. PCT/US2014/014634, dated May 21, 2014, 16 pages.

(Continued)

*Primary Examiner* — Joseph P Martinez  
(74) *Attorney, Agent, or Firm* — Smith Baluch LLP

(57) ABSTRACT

An electro-chromic device including a solid or quasi-solid electrolyte layer is disclosed. The electrolyte layer may be a composite polymeric electrolyte layer. The polymeric electrolyte layer may be a conductive transparent adhesive or an optically transparent cured electrolyte. The electrolyte layer may also be a porous optically transparent membrane impregnated or embedded with an electrolytic material. Methods for forming solid or quasi-solid electrolyte layers in-situ in electro-chromic devices are also provided.

22 Claims, 12 Drawing Sheets

(56) References Cited

U.S. PATENT DOCUMENTS

| | | | |
|---|---|---|---|
| 5,404,244 A * | 4/1995 | Van Dine | C03C 17/3411 359/265 |
| 5,825,526 A | 10/1998 | Bommarito et al. | |
| 5,995,271 A | 11/1999 | Zieba et al. | |
| 6,159,639 A * | 12/2000 | Wen | C08G 18/0823 429/309 |
| 6,767,624 B2 | 7/2004 | Bronstert | |
| 7,374,283 B2 * | 5/2008 | Blum | G02B 26/06 351/159.03 |
| 2007/0041074 A1 * | 2/2007 | Mathey | G02F 1/15 359/265 |
| 2009/0008031 A1 | 1/2009 | Gould et al. | |
| 2010/0079846 A1 * | 4/2010 | Mazurkiewicz et al. | 359/275 |
| 2010/0165440 A1 | 7/2010 | Nguyen et al. | |
| 2010/0308253 A1 * | 12/2010 | Swift et al. | 252/62.2 |
| 2011/0075248 A1 | 3/2011 | Lecain et al. | |
| 2012/0134004 A1 * | 5/2012 | Melcher et al. | 359/266 |
| 2012/0147448 A1 | 6/2012 | Yaniv et al. | |
| 2013/0120821 A1 * | 5/2013 | Chandrasekhar | G02F 1/1506 359/265 |

FOREIGN PATENT DOCUMENTS

| | | |
|---|---|---|
| JP | 2000509161 A | 7/2000 |
| JP | 2003156767 A | 5/2003 |
| JP | 2007052236 A | 3/2007 |

OTHER PUBLICATIONS

Extended European Search Report for Application No. EP 14745813.7, Applicant: Mitsui Chemicals, Inc., dated Aug. 2, 2016.

Notice of Reasons for Rejection and English Translation thereof in Japanese Patent Application No. 2015-556223 dated Mar. 30, 2018. 6 pages.

European Office Action in European Patent Application No. 14745813.7 dated Nov. 21, 2019, 6 pages.

\* cited by examiner

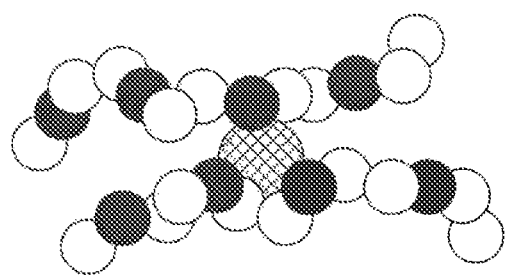
FIG. 2A
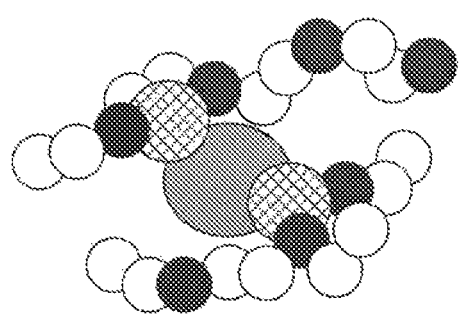
FIG. 2B

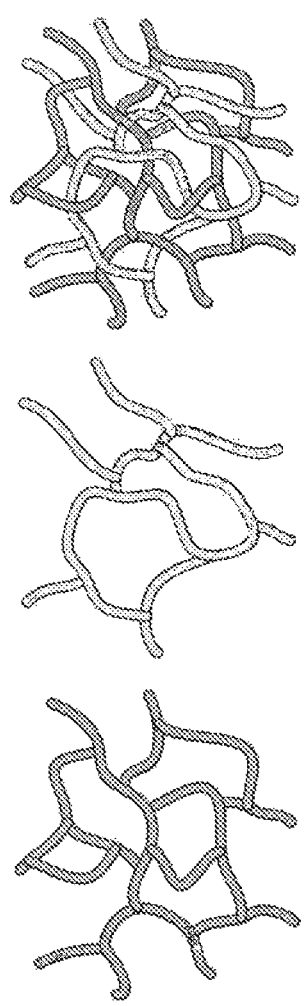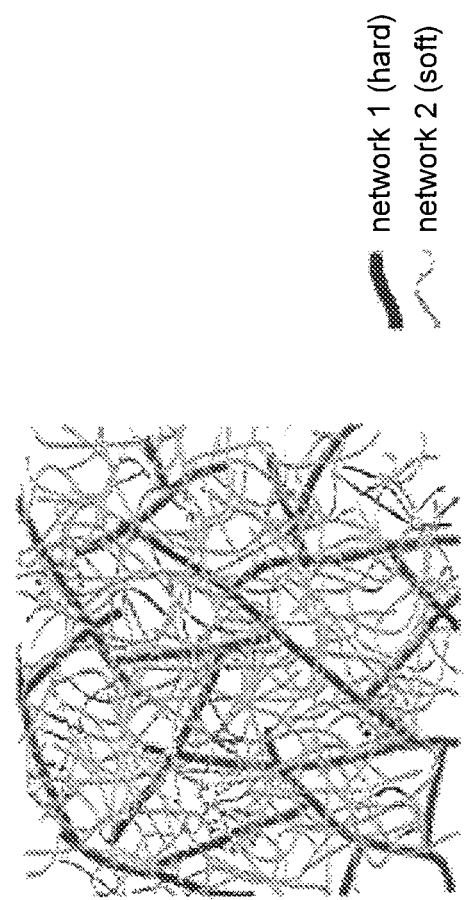

ELECTRO-CHROMIC DEVICES INCLUDING SOLID OR QUASI-SOLID ELECTROLYTE LAYERS AND METHODS OF MAKING THE SAME

CROSS-REFERENCE TO RELATED APPLICATIONS

This application claims priority to the following U.S. Provisional patent applications, all of which are hereby incorporated by reference in their entirety:

Ser. No. 61/760,440 titled "Methods for making robust electro-chromic film stacks", filed Feb. 4, 2013; and Ser. No. 61/897,874 titled "Optically-transparent solid-state and quasi-solid-state electrolytes", filed Oct. 31, 2013.

FIELD OF THE INVENTION

The present disclosure relates to solid or quasi-solid electrolytes for use in electro-chromic devices. More specifically, the present disclosure related to solid or quasi-solid electrolytes that can be formed in-situ during the manufacturing of electro-chromic devices.

BACKGROUND

Despite the large number of on-going research studies in the field of various electro-chromic (EC) technologies, there is still a need of compact and mechanically-robust solid-state electro-chromic film stack, which can be easily applied on an existing lens blank, semi-finished blank (SFB) or other surfaces that need controllable variable transmission performance. Such an EC stack should operate under low voltage, and thus, not require large, heavy and aesthetically non-acceptable batteries. Furthermore, the variable transmission EC stack should be fast-responding with a satisfactory dynamic range compared to the current available photochromic lenses and other switching technologies.

SUMMARY OF THE INVENTION

Some embodiments include a device having a first transparent conductive layer and a second transparent conductive layer; at least one electro-chromic layer disposed between the first transparent conductive layer and the second transparent conductive layer; and a solid or quasi-solid electrolyte layer disposed between the first transparent conductive layer and the second transparent conductive layer and in contact with the at least one electro-chromic layer. The solid or quasi-solid electrolyte layer being selected from the group consisting of: a conductive transparent adhesive, an optically-transparent photo-cured electrolyte, and an optically transparent thermally-cured electrolyte. The solid or quasi-solid electrolyte layer being a composite material comprising at least three major components, each major component present in a concentration greater than or equal to 10 wt %.

In some embodiments, the composite material includes one or more major component that is a polymer. In some embodiments, the composite material includes at least two major components that are polymers.

In some embodiments, the composite material includes one or more major component selected from the group consisting of: polyacrylate, polymethacrylate, polyvinilidene difluoride (PVDF), polyethylene oxide (PEO), polyurethane (PU), polyacrylonitrile (PAN), polyaniline (PANI), polyvinyl chloride (PVC), polyvinyl acetate (PVAc), succinonitrile (SN), acrylate polymers, and methacrylate polymers.

In some embodiments, the composite material includes at least two major components selected from the group consisting of: polyacrylate, polymethacrylate, polyvinilidene difluoride (PVDF), polyethylene oxide (PEO), polyurethane (PU), polyacrylonitrile (PAN), polyaniline (PANI), polyvinyl chloride (PVC), polyvinyl acetate (PVAc), succinonitrile (SN), acrylate polymers, and methacrylate polymers.

In some embodiments, the composite material includes one of the following combinations of major components: acrylate blend/PVDF-TrFE, acrylate blend/PVDF-HFP, acrylate blend/PU, acrylate blend/PEO, acrylate blend/PVC, acrylate blend/PAN, acrylate blend/PVAc, acrylate blend/PAN, acrylate blend/SN, methacrylate blend/PVDF-TrFE, methacrylate blend/PVDF-HFP, methacrylate blend/PU, methacrylate blend/PAN, methacrylate blend/PEO, methacrylate blend/PVC, methacrylate blend/PVAc, PEO/PAN, PU/PAN, PEO/PU/PAN, acrylate blend/PEO/PVDF-HFP, acrylate blend/SN/PVDF-HFP, a blend of at least two acrylates, a blend of at least two methacrylates, or a acrylate/methacrylate blend.

In some embodiments, the composite material includes one of the following combinations of major components: acrylate blend/PVDF-HFP, acrylate blend/PEO, methacrylate blend/PVDF-HFP, methacrylate blend/PEO, a blend of at least two acrylates, a blend of at least two methacrylates, or an acrylate/methacrylate blend.

In some embodiments, the composite material includes one or more major component that is an ionic salt. In some embodiments, the ionic salt is an ionic salt including an anion selected from the group consisting of: ClO4−, CF3SO3−, (CF3SO2)2N−, (CF3SO2)3C−, AsF6−, and PF6−. In some embodiments, the ionic salt is an ionic salt including a cation selected from the group consisting of: Li+, Na+, K+, and H+.

In some embodiments, the solid or quasi-solid electrolyte layer has a conductivity greater than 10-4 S/cm at ambient temperature. In some embodiments, the solid or quasi-solid electrolyte layer has an average transmission of more than 85% in the visible spectral range.

In some embodiments, the composite material comprises at least four major components. In some embodiments, the composite material comprises at least five major components.

In some embodiments, the composite material is a cross-linked system, an interpenetrating polymeric network, a semi interpenetrating polymeric network, or a polymer blend.

In some embodiments, the solid or quasi-solid electrolyte layer is a conductive adhesive. In some embodiments, the conductive adhesive is a heat cured adhesive, a UV cured adhesive, or a pressure-sensitive adhesive.

In some embodiments, the solid or quasi-solid electrolyte layer is an optically-transparent photo-cured, thermally-cured, or electron beam cured electrolyte.

In some embodiments, the solid or quasi-solid electrolyte layer includes at least one of: an ionic salt, an ionic liquid, a plasticizer, an initiator, an inhibitor, a binder, inorganic nanoparticles, or a viscosity modifier.

Some embodiments include a device having a first transparent conductive layer and a second transparent conductive layer; at least one electro-chromic layer disposed between the first transparent conductive layer and the second transparent conductive layer; and a solid or quasi-solid electrolyte layer disposed between the first transparent conductive layer and the second transparent conductive layer and in contact with the at least one electro-chromic layer. The solid or quasi-solid electrolyte layer including a porous optically-transparent membrane impregnated or embedded with an electrolyte.

In some embodiments, the electrolyte is a liquid electrolyte.

In some embodiments, the porous membrane has macro-pores, meso-pores, micro-pores, or a combination thereof. In some embodiments, the porous membrane has the same refractive index as the refractive index of the electrolyte. In some embodiments, the porous membrane is made of a material selected from the group consisting of: $TiO_2$, $SiO_2$, $ZrO_2$, ZnO, ceramics, acrylate, epoxy, urethane, and a combination thereof. In some embodiments, the porous membrane is made of a material selected from the group consisting of: $TiO_2$, $SiO_2$, $ZrO_2$, ZnO, and ceramics. In some embodiments, the porous membrane is made of a material selected from the group consisting of: acrylate, epoxy, and urethane.

Some embodiments include a device having an electrolyte and at least one electro-chromic layer treated with ions that generate color change under applied voltage, in addition to the ions provided by the electrolyte.

In some embodiments, the at least one electro-chromic layer is treated using a lithiation process.

Some embodiments include a method including providing a first substrate having a first conductive layer and a second substrate having a second conductive layer; disposing at least one electro-chromic layer over the first conductive layer, forming a solid or quasi-solid electrolyte layer in situ over the at least one electro-chromic layer. The in-situ formation including disposing one or more precursor materials over the at least one electro-chromic layer and assembling the first substrate and the second substrate.

In some embodiments, the solid or quasi-solid electrolyte layer is formed in-situ before the first substrate and the second substrate are assembled. In some embodiments, the solid or quasi-solid electrolyte layer is formed in-situ after the first substrate and the second substrate are assembled.

In some embodiments, the method includes curing the precursor materials after the first substrate and the second substrate are assembled.

In some embodiments, the electrolyte layer is a composite material. In some embodiments, the electrolyte layer is a porous optically-transparent membrane impregnated or embedded with an electrolyte.

Some embodiments include a method including providing a first substrate and a second substrate; disposing a first conductive layer and at least one electro-chromic layer over the first substrate; applying a removable layer to the second substrate; disposing a second conductive layer over the removable layer; disposing an electrolyte layer between the first conductive layer and the second conductive layer and in contact with the at least one electro-chromic layer, thereby forming an electro-chromic device; and removing the second substrate from the electro-chromic device by removing the removable layer.

In some embodiments, the electrolyte layer is formed between the first conductive layer and the second conductive layer in-situ. In some embodiments, the electrolyte layer is a solid or quasi-solid electrolyte layer.

In some embodiments, the removable layer is a release liner or a release agent.

Some embodiments include a method including providing a first substrate and a second substrate, the second substrate being soluble; disposing a first conductive layer and at least one electro-chromic layer over the first substrate; disposing a second conductive layer over the second substrate; disposing an electrolyte layer between the first conductive layer and the second conductive layer and in contact with the at least one electro-chromic layer, thereby forming an electro-chromic device; and removing the second substrate from the electro-chromic device using a solvent.

In some embodiments, the second substrate is polyvinyl alcohol and the solvent is water.

BRIEF DESCRIPTION OF THE DRAWINGS

FIGS. 2A and 2B show less mobile ion pairs that can be formed at high salt concentrations in a PEO host.

FIGS. 4A and 4B show examples of interpenetrating networks (IPNs) according to some embodiments.

DETAILED DESCRIPTION

An EC film stack should preferably survive all post-processing steps of SFBs, such as edging into different lens shapes and grooving, which is not the case with non-solid EC devices utilizing only liquid electrolytes. Furthermore, if the EC film stack can be deposited (coated) on a single substrate, it will result in a beneficial reduction in the "bulkiness" of the final product (ophthalmic lens, motor-cycle helmets, variety of optical products, etc.).

Furthermore, despite the numerous research activities in the field of solid-state electrolytes for various applications, for example, thin film batteries, fuel cells, supercapacitors, etc, there is still a need for mechanically-, dimensionally-, electrochemically-, thermally- and chemically-stable solid electrolytes. For applications such as transmissive electro-chromic devices, optical transparency of the electrolyte is desirable. Solid-state and quasi-solid-state electrolytes offer many advantages over their liquid counterparts. For example, solid and quasi-solid state electrolytes eliminate the possibility of liquid leakage from an electro-chemical device. Among the solid-state and quasi-solid-state electrolytes, polymer, hybrid/composite polymer, and polymer nanocomposite electrolytes are the easiest to prepare and process.

Figure 1:
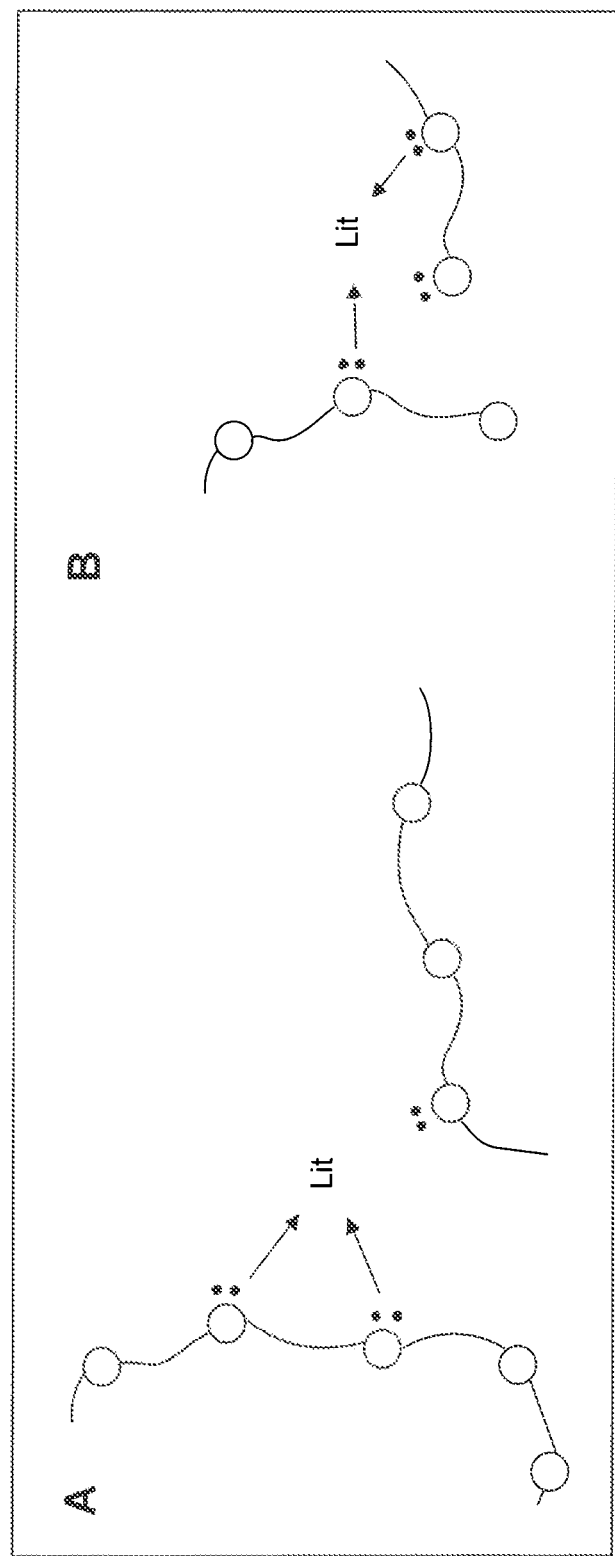
FIGS. 1A and 1B show possible modes of solvation of Li-ions by O-atoms (electron donors) from PEO chains.

The ion transport in polymer/hybrid electrolytes is believed to take place via a combination of ion motion coupled with the local motion of polymer segments. Therefore, the ion transport may be greatly affected by the local relaxation process of the polymer chain, i.e. polymer segmental mobility or the so-called glass transition temperature (Tg). Ion conductivity is highest in an amorphous phase material, which is more flexible than the rigid crystalline phase material. Furthermore, the mechanism of ion (cation) transport in ion-conducting polymers highly depends on the interactions between the polymer and an ionic salt. A significant factor behind the ionic transport mechanism in polymer-based systems is the degree and nature of the ionic association. In other words, ionic transport is dependent on (i) the ion solvation by the polymer, which happens only if atoms that are capable of coordinating the cations are available on the polymer chains, and (ii) the occurrence of a complex formation FIGS. 1A and 1B give examples of possible solvation modes of Li-cations by etheric oxygen atoms (electron donors) in PEO. FIG. 1A shows intra-chain solvation and FIG. 1B shows interchain solvation. Other examples for electron pairs that can coordinate with cations from inorganic ionic salts (e.g. Li+, H+, K+, and Na+) to form polymer-salt complexes and provide ionic conduction include C=O and C—O—C oxygen atoms in acrylates/methacrylates and fluorine atoms in PVDF-based polymers and copolymers.

Therefore, a set of criteria for a successful polymer host for an electrolyte, a polymer or the active part of a copolymer or a polymer blend, is:

(i) atoms or groups of atoms with sufficient electron donor power to form coordination bonds with the cations;

(ii) low barriers to bond rotation so that segmental motion of the polymer chain can take place readily; and (iii) a suitable distance between coordinating centers because the formation of multiple intrapolymer ion bonds is desirable.

The ion conduction in polymer matrix is a complex phenomenon, but it can be described using the equation below:

$$\sigma(T) = \sum_i n_i q_i \mu_i$$

where:

$n_i$ is the number of charge carriers (i)

$q_i$ is the charge of each carrier $\mu_i$ is the mobility of each carrier

For example, if the cross-link density is low, the conductivity will be controlled by the number of charge carriers ($n_i$). The mobility ($\mu_i$) of the charge carriers (ions) is relatively unaffected at low salt concentration, but as the number of charge carriers increases (e.g. at higher salt concentrations), ion pairs and larger aggregates can be formed, which limits conductivity. FIG. 2A shows an example of a less mobile pair and FIG. 2B shows an example of a less mobile aggregate that can be formed at high salt concentrations in a PEO host.

Figure 3:
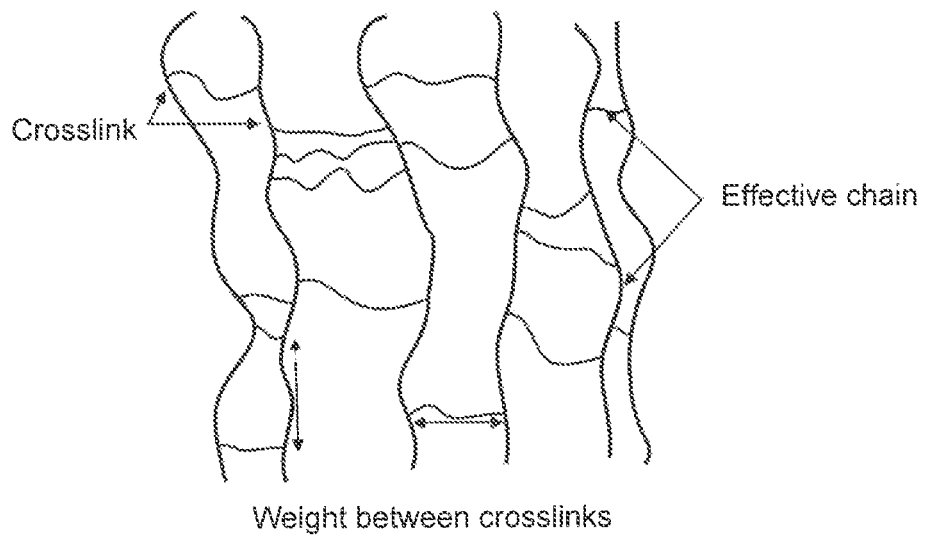
FIG. 3 shows a schematic illustrating various factors that may affect the ion conductivity in polymeric electrolytes.

FIG. 3 is a schematic illustrating various factors that may affect the ion conductivity in polymeric electrolytes. FIG. 3 illustrates a schematic of a cross-linked system (e.g. photo-, thermally-, or e-beam-cross-linked). Factors affecting the ion conductivity in polymer cross-linking systems include the degree of cross-linking and the effective chain length, i.e. effective molecular weight between the cross-links. Potential polymers for electrolyte host matrices for electro-chromic devices include polar polymers such as polyethylene oxide (PEO), acrylates, methacrylates, succinonitrile (SN), polyacylonitrile (PAN), and fluoro-polymers. These polymers are of particular interest because of their affinity to electrolyte solutions.

The carboxylic group (—COOH) in acrylate- and methacrylate-based host polymers can improve interconnecting pathways, which will ease ion movement through polymer segments. These large pendant groups limit the close packing of the chains in the acrylate and methacrylate polymers, thereby increasing the free volume for ion movement. Furthermore, increased separation between chains increases the translational mobility of the polymer, which lowers the Tg of amorphous acrylate/methacrylate polymers.

Among highly polar polymers, polyvinylidene fluoride (PVDF) is a preferred polymer because it is a cost effective material that can provide electrochemical stability, oxidation resistance, chemical resistance, and mechanical stability. However, PVDF like PEO, are in general, crystalline polymers. To suppress crystallinity, these polymers may be co-polymerized with other monomers to from co-polymers (block or graft), for example, PEO-PPO-PEO (PPO=poly(propylene oxide), PEO-PS-PEO (PS=polystyrene), PVDF-co-HFP (HFP=hexafluoropropylene), PVDF-co-TrFE (TrFE=trifluoroethylene) co-polymers. For instance, the amorphous HFP phase of the PVDF-HFP copolymer helps to capture large amounts of liquid electrolytes, while the PVDF crystalline phase acts as a mechanical support for the polymer.

Besides the polymer host, the anion nature of an ionic salt ($C^+A^-$) plays a significant role in the cation ($C^+$) transport through the polymer matrix. Preferred criteria considered during selection of the ionic salt are:

(i) salts having large polyatomic anions, which will provide better dissolution e.g. $ClO_4^-$, $CF_3SO_3^-$, $(CF_3SO_2)_2N^-$, $(CF_3SO_2)_3C^-$, $AsF_6^-$, $PF_6^-$ (ii) salts having highly polarizable, monovalent anions polyatomic anions $A^-$ with monovalent charge have weak anion solvation. For instance, LiF is insoluble in PEO, but $LiClO_4$ is soluble in PEO.

(iii) salts having anions that are weak bases, (iv) salts having anions with a delocalized charge, (v) salts having anions with low lattice energies, i.e. little tendency to form tight ion pairs.

This specification discloses one or more embodiments that incorporate the features of this invention. The disclosed embodiment(s) merely exemplify the invention. The scope of the invention is not limited to the disclosed embodiment(s). Multiple inventions may be described. The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to implement such feature, structure, or characteristic in connection with other embodiments whether or not explicitly described.

As used herein the terms "composite material" or "hybrid material" means a material made from two or more components.

As used herein the term "component" includes, but is not limited to, polymers, oligomers, monomers, plasticizers, ionic salts, nanoparticles, and ionic liquids. For materials having repeat units, such as polymers, oligomers and monomers, each type of distinct repeat unit should be considered a separate component, regardless of how those repeat units are attached to each other. So a co-polymer would be considered to have two or more components. Repeat units having the same backbone structure are defined as a single "component" regardless of whether or not they have different pendant side groups. For example, a mixture of monofunctional methacrylate monomers should be considered a single "component" even though the mixture may contain methyl methacrylate, ethyl methacrylate, propyl methacrylate, and butyl methacrylate monomers. Similarly, a mixture of oligomers of different length, but made of the same repeat unit, would be considered a single "component."

As used herein the term "major" component means a component of a composite or hybrid material that is present in a concentration greater than or equal to 10 wt %. Major components may include, but are not limited to, polymers, oligomers, monomers, plasticizers, ionic salts, nanoparticles, and ionic liquids. When a component is present in an uncured mixture, such as a solution, the wt % of the component is measured relative to every component in the mixture, excluding solvents that will not be present in the final product. In other words, solvents are not factored into the wt % calculations of uncured mixtures. For example, if an uncured mixture is composed of 33 wt % monomer A, 33 wt % monomer B, and 33 wt % water, the weight percent of monomer A and monomer B for purposes of determining what is a "major" component is 50 wt % each. As such, the wt % of a component in an uncured mixture and the cured form of that mixture is the same. For example, when monomer A and monomer B are polymerized into co-polymer A-B, monomer A and monomer B would still have a concentration of 50 wt % in the cured mixture.

As used herein the term "nanocomposite" means a composite material including a nano-sized material such as nanoparticles.

As used herein, "top" means furthest away from the substrate, while "bottom" means closest to the substrate. Where a second layer is described as "disposed over" a first layer, the second layer is disposed further away from the substrate. There may be other layers between the first and second layer, unless it is specified that the first layer is "in contact with" the second layer. For example, an electro-chromic layer may be described as "disposed over" the substrate, even though there are various layers in between the electro-chromic layer and the substrate. Furthermore, if a second layer is "disposed over" a first layer, the second layer is formed or deposited after the first layer (i.e. the first layer is present before the second layer is disposed over it).

As used here the term "polymer" means a large molecule composed of many repeated sub-units, known monomers. As used herein, the term "oligomer" means a molecular complex composed of a few monomer units. For example, a dimer, trimer, and tetramer are oligomers composed of two, three, and four monomers, respectively.

Some disclosed embodiments relate to optically-transparent solid-state and quasi-solid-state polymer, hybrid/composite polymer, and polymer nanocomposite electrolytes for their potential use in electro-chromic and other electrochemical devices. During the selection of a polymer host for the electrolyte according to some embodiments, the following molecular parameters were considered:

1) polymers with polar groups, which can behave as solvents to dissolve salts and form ionpolymer complex (ion salvation)
   e.g. Li ion solvation can happen with O-atoms of PEO chain or F-atoms of PVDF-based chains;
2) polymers with large/bulky pendants, which suppress close packing and facilitate more free volume, and hence, more mobility of polymer chains (lower Tg)
   e.g. —COOH groups in acrylates/methacrylates improve interconnecting pathways and ease ion movement through polymer segments;
3) molecular weight ($M_w$) of the polymers, which has an effect on crystallization, effect on free volume, etc.
   e.g. stiff polymeric matrices with a high degree of cross-links are not desirable, so the degree of polymerization is ideally low to provide a flexible final polymeric system/network.

In some embodiments, the polymer electrolytes were, in general, polymer blends or composite networks of two or more polymers. The reason for this was to provide an electrolyte having sufficient mechanical strength to survive any post-processing steps. For example, a PVDF-based polymer or copolymer was added to relatively soft and flexible acrylate/methacrylate polymer blend in order to improve the overall mechanical strength and dimensional stability of the electrolyte. The mixing of different polymer and/or copolymer materials may result in the formation of interpenetrating networks (IPNs).

FIGS. 4A and B illustrate examples of interpenetrating networks (IPNs) according to some embodiments. FIG. 4A illustrates an IPN formed from two independent networks, formed simultaneously or subsequently. FIG. 4B illustrates an example of providing mechanical strength to an elastic IPN system by interlocking a hard/tough polymer and a soft/flexible polymer.

Additionally, for an electrolyte to be effective in an electro-chromic device, it needs to have a high ionic conductivity and good contact with the electrodes (i.e. electro-chromic layers). In some embodiments, the solid or quasi-solid electrolyte has an ionic conductivity greater than $10^{-4}$ S/cm at ambient temperature. In some embodiments, the solid or quasi-solid electrolyte is formed on an electro-chromic layer(s) in-situ. If the electrolyte preparation, or the final steps of the electrolyte preparation process, can be done in situ in the electro-chromic device, the contact between the electrolyte and the electro-chromic layer(s) can be improved.

Figure 5A:
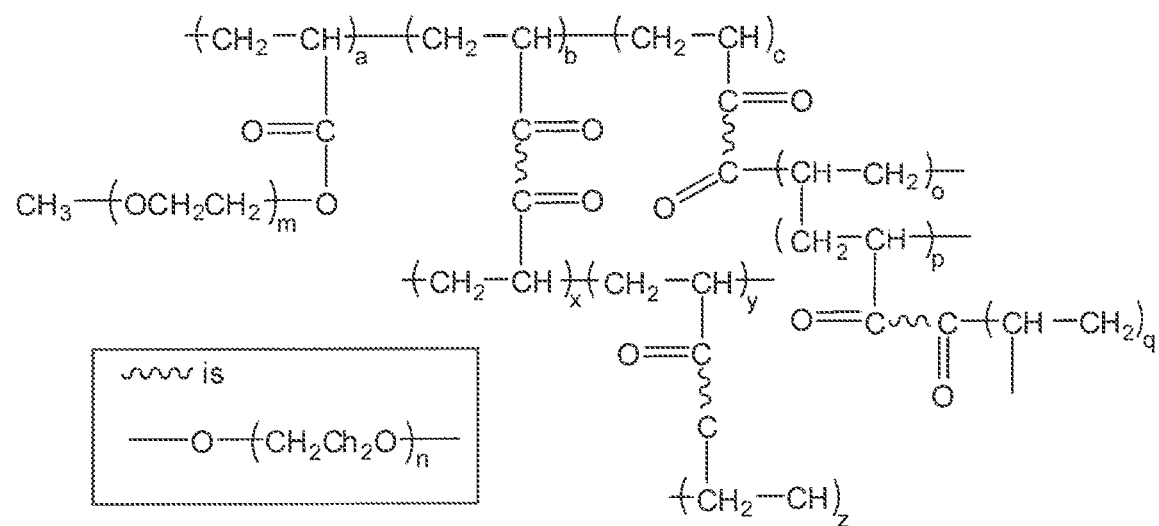
FIGS. 5A and 5B show examples of polymeric systems according to some embodiments.
Figure 5B:
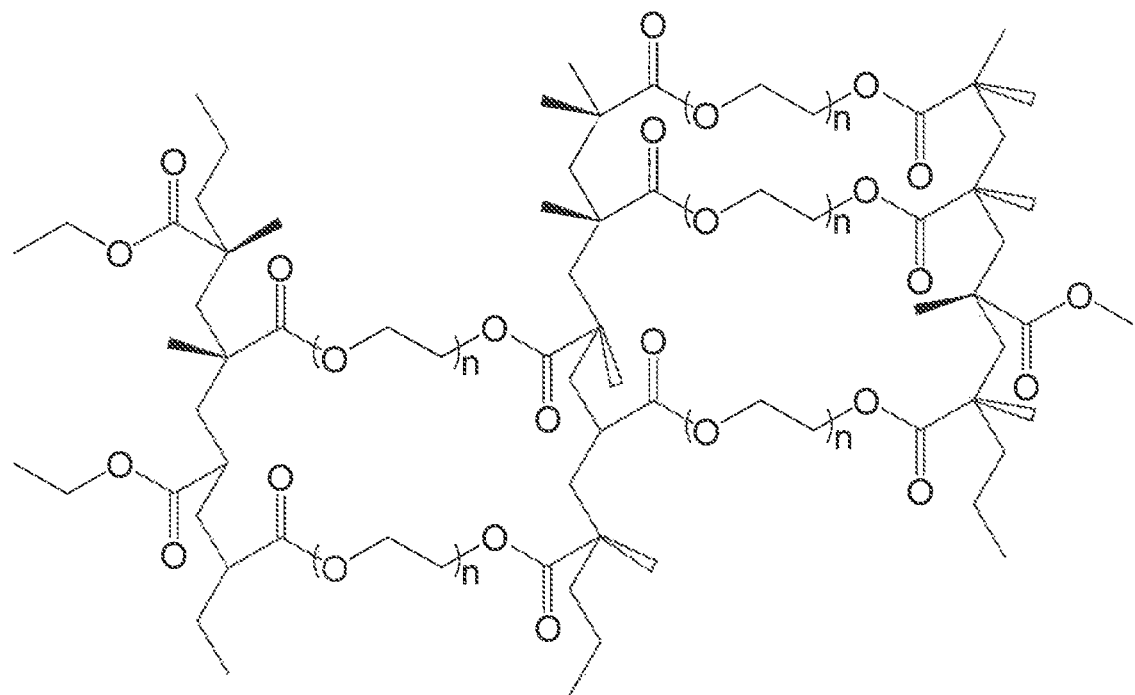

FIGS. 5A and B show examples of cross-linked acrylate/methacrylate polymer systems according to some embodiments. FIG. 5A illustrates an example of a polymer cross-linked network formed by monofunctional- and difunctional acrylates and PEG-acrylates The numbers a, b, c, m, n, o, p, q, x, y, z will dictate the mechanical strength and flexibility of the final system and thus the ionic conductivity. FIG. 5B illustrates an example of a polymer cross-linked network formed from PEG dimethacrylates. The number n will dictate the mechanical strength and flexibility of the final system and thus the ionic conductivity.

Preferably, the solid or quasi-solid polymer electrolyte is composite material having conductivity greater than 10-4 S/cm at ambient temperature. Electrolytes having high conductivity increases the switching time within electro-chromic devices, i.e. the time it takes for an electro-chromic device to fully change from first transparency/color to a second transparency/color. Preferably, the solid or quasi-solid electrolyte is a composite material that provides a switching time between 3 and 5 seconds for an electrochromic device.

In some embodiments, the electrolyte is formed in situ by introducing it in its monomer/oligomer (i.e. uncured) form into the electro-chromic device or onto an electro-chromic layer, and subsequently cross-linking (i.e. solidifying) it by means of UV-light, heating, e-beam, electrical potential curing methods, or any combination thereof. Acrylate and methacrylate monomers/oligomers are particularly useful for such in-situ methods due to their ease of polymerization and the wide spectrum of properties that they offer.

In some embodiments, the chemical composition of the electrolytes may include, but is not limited to one or more of the following polymers: polyacrylate, polymethacrylate, polyvinilidene difluoride (PVDF), polyethylene oxide (PEO), polyurethane (PU), polyacrylonitrile (PAN), polyaniline (PANI), polyvinyl chloride (PVC), polyvinyl acetate (PVAc), succinonitrile (SN), acrylate polymers, methacrylate polymers, or other polar polymers, or binary, ternary or higher order combinations thereof. In some embodiments, the electrolytes are composite materials including at least one of these polymers as a major component. Some combinations of polymers include, but are not limited to: acrylate blend/PVDF-TrFE, acrylate blend/PVDF-HFP, acrylate blend/PU, acrylate blend/PEO, acrylate blend/PVC, acrylate blend/PAN, acrylate blend/PVAc, acrylate blend/PAN, acrylate blend/SN, methacrylate blend/PVDF-TrFE, methacrylate blend/PVDF-HFP, methacrylate blend/PU, methacrylate blend/PAN, methacrylate blend/PEO, methacrylate blend/PVC, methacrylate blend/PVAc, PEO/PAN, PU/PAN, PEO/PU/PAN, acrylate blend/PEO/PVDF-HFP, acrylate blend/SN/PVDF-HFP, a blend of at least two acrylates, a blend of at least two methacrylate, and an acrylate/methacrylate blend.

In some embodiments, additives may be added to the polymer, hybrid/composite, or polymer nanocomposite electrolyte. By way of example only, one or more of the following additives may be added to the polymer, hybrid/composite or nanocomposite electrolyte: plasticizer(s), ionic liquids as conductors and/or plasticizers, initiators (photo-, thermal-initiators), inhibitors, cross-linkers, viscosity additives/modifiers, binders, and inorganic nanoparticles.

Plasticizers may be low molar mass organics. Preferably, a plasticizer has a high dielectric constant to ensure strong charge dissociation and provide a liquid-like environment within the polymer matrix, both of which facilitate ion transport. Plasticizers can plasticize the polymer host thereby causing an improvement in flexibility and segmental motion. Furthermore, plasticizers can solvate ions thus improving the conductivity of the electrolyte. Plasticizers utilized in electrolytes according to some embodiments may include, but are not limited to, propylene carbonate (PC), ethylene carbonate (EC), dimethyl carbonate (DMC), diethyl carbonate (DEC), and γ-butyrrolactone (γ-BL). Low molecular weight glycols, such as diglyme, tetraglyme and polyethylene glycol dimethylether (PEGDME) may also be used in some embodiments. Preferably, the polymer, hybrid/composite, or nanocomposite electrolyte behaves like a liquid with high ionic conductivity, but has the dimensional stability of a solid.

In some embodiments, very small quantities of metal nanoparticles and/or metal oxide nanoparticles may be added to the electrolyte. Metal nanoparticles and/or metal oxide nanoparticles utilized in some embodiments be composed of materials such as, but not limited to: Ti, Zn, Zr, Al, Sb, Sn, Bi, Cr, Ce, Cu, Fe, Li, Na, K, Ca, Mg, W, Ir, Mn, Mo, and metal oxides thereof. Metal or metal oxide nanoparticles can significantly change the properties of the electrolyte. Metal or metal oxide nanoparticles can, for example, modify the refractive index of electrolyte to match the refractive index of electro-chromic layers. Depending on the fraction of the nanoparticles in the final electrolyte, the final electrolyte can belong to the class of nanocomposite electrolyte or composite/hybrid electrolyte.

In some embodiments, the solid or quasi-solid electrolyte is a composite material including at least three major components selected from, but not limited to, any combination of (1) the polymers polyacrylate, polymethacrylate, polyvinilidene difluoride (PVDF), polyethylene oxide (PEO), polyurethane (PU), polyacrylonitrile (PAN), polyaniline (PANI), polyvinyl chloride (PVC), polyvinyl acetate (PVAc), succinonitrile (SN), acrylate polymers, methacrylate polymers, or other polar polymers, (2) binary, ternary or higher order combinations thereof, including but not limited to, acrylate blend/PVDF-TrFE, acrylate blend/PVDF-HFP, acrylate blend/PU, acrylate blend/PEO, acrylate blend/PVC, acrylate blend/PAN, acrylate blend/PVAc, acrylate blend/PAN, acrylate blend/SN, methacrylate blend/PVDF-TrFE, methacrylate blend/PVDF-HFP, methacrylate blend/PU, methacrylate blend/PAN, methacrylate blend/PEO, methacrylate blend/PVC, methacrylate blend/PVAc, PEO/PAN, PU/PAN, PEO/PU/PAN, acrylate blend/PEO/PVDF-HFP, acrylate blend/SN/PVDF-HFP, a blend of at least two acrylates, a blend of at least two methacrylate, and an acrylate/methacrylate blend and (3) additives, including but not limited to, plasticizers, ionic salts, nanoparticles, and ionic liquids. Preferably, the solid or quasi-solid electrolyte is a composite material including at least four major components. More preferably, the solid or quasi-solid electrolyte is a composite material including at least five major components. The use of three or more major components allows for unexpected and high desirable combinations of properties that may not be readily achievable with a smaller number of major components.

Preferably, the solid or quasi-solid electrolyte is an optically transparent composite material having an average transmission of more than 85% in the visible spectral range, more preferably an average transmission of more than 87% in the visible spectral range, and more preferably an average transmission of more than 90% in the visible spectral range.

In some embodiments, the ionic salt is an ionic salt having an anion selected from the group including, but not limited to, $ClO_4^-$, $CF_3SO_3^-$, $(CF_3SO_2)_2N^-$, $(CF_3SO_2)_3C^-$, $AsF_6^-$, and $PF_6^-$. In some embodiments, the ionic salt is an ionic salt having a cation selected from the group including, but not limited to, $Li+$, $Na+$, $K+$, and $H+$.

In some embodiments, the electrolyte can include components that are not major components. These components can include, but are not limited to, any of the above major components in a concentration less than 10 wt %, initiators (photo-, thermal-initiators), inhibitors, cross-linkers, viscosity additives/modifiers, and binders.

In some embodiments, the solid or quasi-solid electrolytes can belong to at least one of the following categories:
1) cross-linked systems (thermally-, photo-, e beam-, electro-cross-linked)
2) interpenetrating networks (IPNs)
3) semi-interpenetrating networks (semi-IPNs),
4) polymer blends or alloys,
5) block- or graft-copolymers,
6) composite networks, or
7) polymer nano- or micro-composite systems.

Some of the materials used in solid or quasi-solid electrolytes according to some embodiments and their chemical structures are listed below.

A. Acrylate and Methacrylate Monofunctional and Difunctional Monomers and Oligomers A1. 2-Hydroxyethyl methacrylate

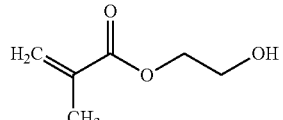

A2. Ethyl methacrylate

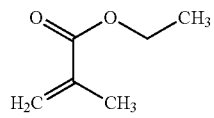

A3. 2-ethoxy-ethyl methacrylate

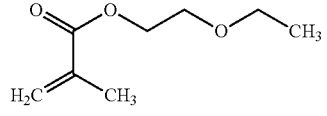

EOEMA

A4. Neopentyl glycol diacrylate

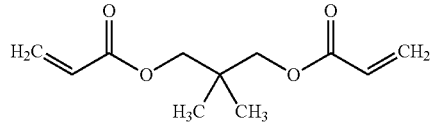

A5. Ethylene glycol dimethacrylate

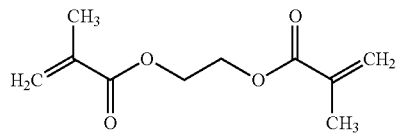

A6. Tetraethylene glycol dimethacrylate

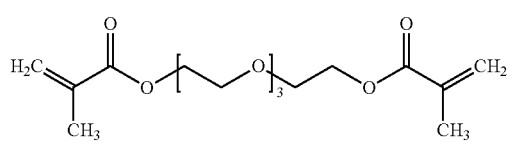

A7. Triethylene glycol dimethacrylate

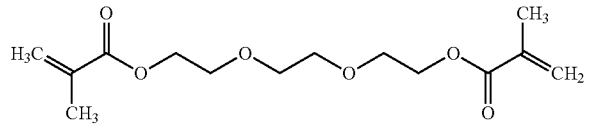

A9. Bisphenol A ethoxylate dimethacrylate (BEMA)

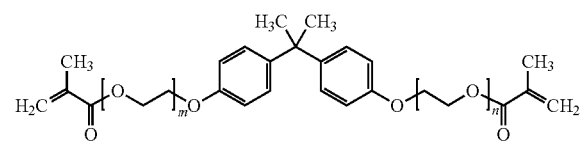

A9. Poly(ethylene glycol) diacrylate

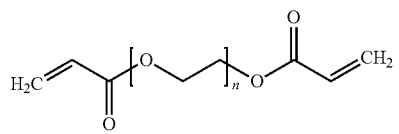

A10. Poly(ethylene glycol) dimethacrylate

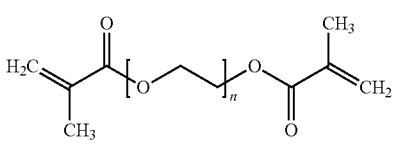

A11. Poly(ethylene glycol) methyl acrylate

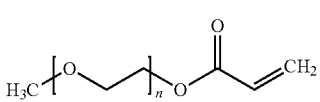

A12. Poly(ethylene glycol)methyl ether metharcrylate

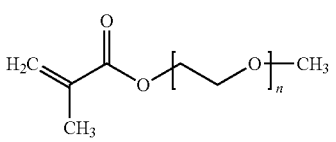

B. Polymers and Copolymers

B1. Poly(ethylene oxide)

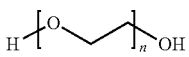

B2. Succinonitrile (butanedinitrile)

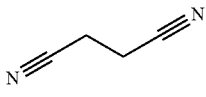

B3. Polyacrylonitrile

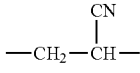

B4. Poly(vinylidene fluoride)

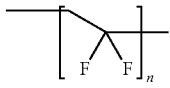

B5. PVDF-HFP

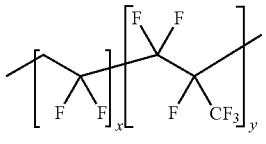

B6. PVDF-TrFE

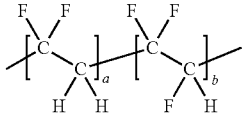

C. Plasticizers

C1. Poly(ethylene glycol)dimethyl ether)

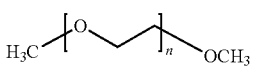

C2. Propylene carbonate

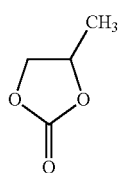

C3. Ethylene carbonate

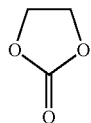

D. Ionic Salts

D1. Lithium trifuoromethanesulfonate

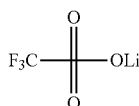

D2. Bis(trifluoromethane)sulfonamide lithium salt

D3. Lithium hexafluorophosphate

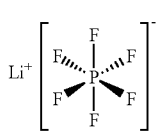

D4. Lithium perchlorate, LiClO4

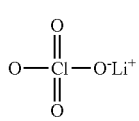

E. Thermal- and Photo-Initiators

E1. Benzophenone

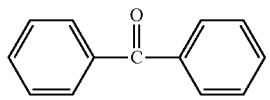

E2. 4,4'bis(dimethylamino)benzophenone

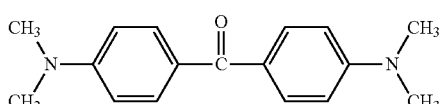

E3. Darocur TPO

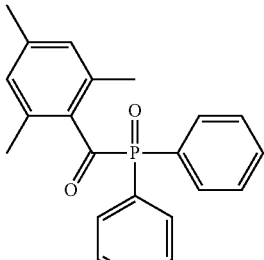

E4. Irgacure 819

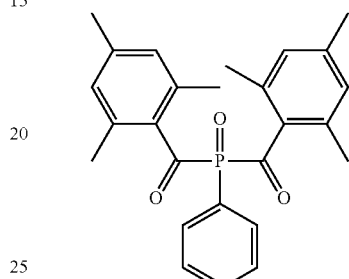

The following examples are formulations of uncured mixtures of solid or quasi-solid electrolytes according to some embodiments. The weight percent (wt %) for each component and/or mixture is measured with respect to all the components and/or mixtures in the formulation excluding solvents. After curing, the mixtures in the following examples would form a solid or quasi-solid electrolyte according to some embodiments.

EXAMPLES

Example 1

A polymer electrolyte formulation including the following components:
1. mixture of monofunctional methacrylate monomers/oligomers (A1, A2 and/or A12), 0-15 wt %
2. mixture of difunctional/diacrylate monomers/oligomers (A4 and/or A9), 10-30 wt %
3. mixture of difunctional/dimethacrylate monomers/oligomers (A6, A7, A8 and/or A10), 0-30 wt %
4. PEO and/or SN polymer (B1 and/or B2), 5-25 wt %
5. plasticizer (C1, C2 and/or C3), 0-10 wt %
6. ionic salt (D1, D2, D3 or D4), 5-30 wt %
7. photoinitiator (E1, E3 and/or E4), 0.5-2 wt %
8. metal/metal oxide nanoparticles, 0-10 wt %

Other additives, such as a curing accelerator, inhibitor, etc. can be added. In example 1, the major components may be A1, A2, A12, A4, A9, A6, A7, A8, A10, B1, B2, C1, C2, C3, D1, D2, D3, D4, or nanoparticles depending on their weight percentage in the solution. For example, if A1 has a concentration of wt 11% and A2 and A12 have concentrations of 2% percent each, A1 is a major component, but A2 and A12 are not.

Example 2

A polymer electrolyte formulation including the following components:

1. mixture of difunctional/diacrylate monomers/oligomers (A4 and/or A9), 10-30 wt %
2. mixture of difunctional/dimethacrylate monomers/oligomers (A6, A7, A8 and/or A10), 20-50 wt %
3. PVDF-based polymer (B4, B5 or B6), 15-40 wt %
4. plasticizer (C1, C2 and/or C3), 5-20 wt %
5. ionic salt (D1, D2, D3 or D4), 5-30 wt %
6. photoinitiator (E2, E3 and/or E4), 0.5-2 wt %
7. metal/metal oxide nanoparticles, 0-10 wt %

Other additives, such as curing accelerator, inhibitor, etc. can be added. In example 2, the major components may be A4, A9, A6, A7, A8, A10, B4, B5, B6, C1, C2, C3, D1, D2, D3, D4, or nanoparticles. For example, if A4 has a concentration of 25 wt % and A9 has a concentration of 1 wt %, A4 is a major component, but A9 is not.

Example 3

A polymer electrolyte formulation including the following components:
1. mixture of monofunctional methacrylate monomers/oligomers (A1, A2 and/or A12), 0-15 wt %
2. mixture of difunctional/diacrylate monomers/oligomers (A4 and/or A9), 5-40 wt %
3. mixture of difunctional/dimethacrylate monomers/oligomers (A6, A7, A8 and/or A10), 5-30 wt %
4. PAN polymer (B3), 10-30 wt %
5. plasticizer (C1, C2 and/or C3), 0-10 wt %
6. ionic salt (D1, D2, D3 or D4), 5-30 wt %
7. photoinitiator (E1, E3 and/or E4), 0.5-2 wt %
8. metal/metal oxide nanoparticles, 0-10 wt %

Other additives, such as curing accelerator, inhibitor, etc. can be added. In example 3, the major components may be A1, A2, A12, A4, A9, A6, A7, A8, A10, B3, C1, C2, C3, D1, D2, D3, D4, and nanoparticles. For example, if A6 and A7 each have a concentration of 12 wt %, and A8 and A10 each have a concentration of 2.5 wt %, A6 and A7 are major components, but A8 and A10 are not.

Some disclosed embodiments are related to methods of making mechanically-robust solid or quasi-solid electro-chromic (EC) film stacks, which can be added or directly coated on a lens blank, a SFB or another surface that needs controllable variable transmission properties. A major challenge in the fabrication of solid-state EC devices is the physical state of the electrolyte, i.e. the ion-transporting layer. In general, liquid electrolytes offer higher conductivity and transparency compared to their solid counterparts. The embodiments discussed below illustrate several non-limiting methods of making robust EC stacks including solid or quasi-solid electrolytes. Some embodiments include methods of making robust EC stacks on a single substrate.

Some embodiments utilize a liquid electrolyte "trapped" in a micro- or meso- or macro-porous membrane. During the post-processing steps (e.g. edging of a SFB) of a product having an EC stack, the liquid electrolyte will remain in the pores of the membrane within the stack, and only the peripheral pores with the electrolyte may be affected by the edging process.

Figure 6:
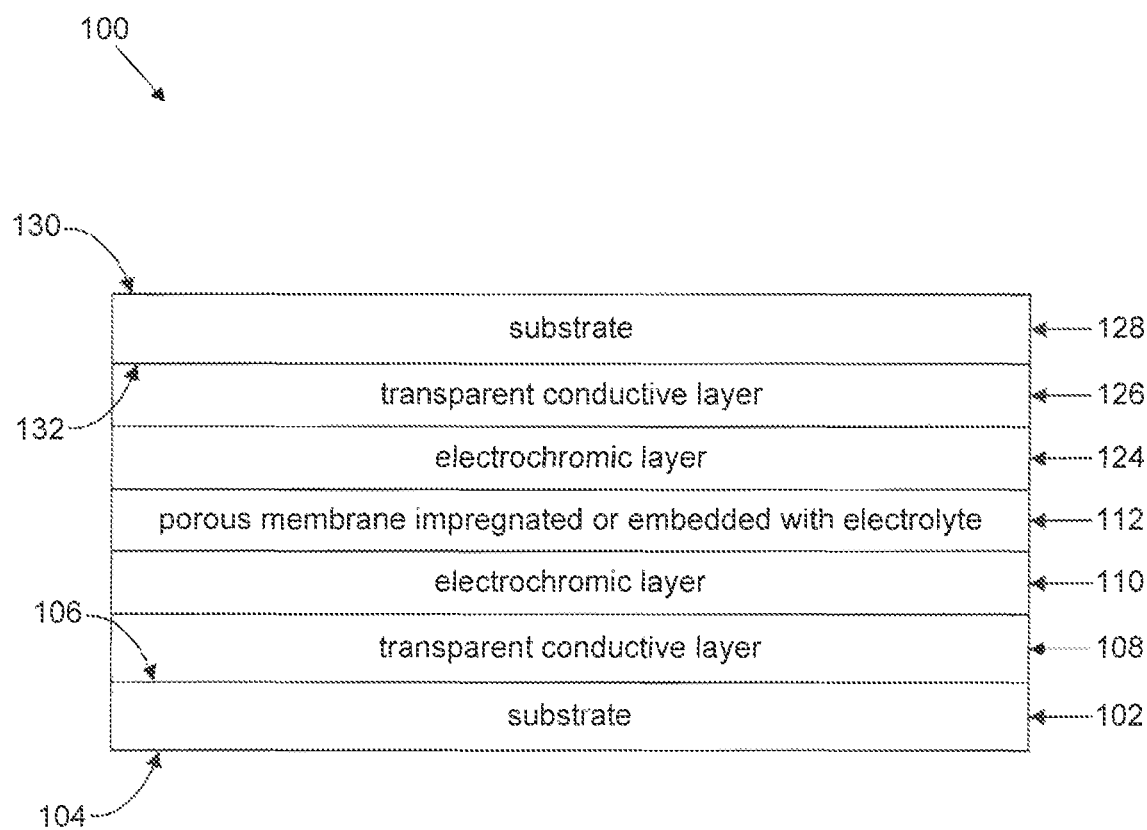
FIG. 6 shows an electro-chromic device according to one embodiment.

FIG. 6 shows an electro-chromic (EC) device 100 with an electrolyte layer 112 that is a porous membrane impregnated or embedded with an electrolyte according to one embodiment. EC device 100 includes a first substrate 102 having a first surface 104 and a second surface 106. Examples of substrates include, but are not limited to, glass or plastic substrates, such as poly(ethylene terephthalate) (PET), poly (ethylene, 2,6-naphthalate) (PEN), polycarbonate (PC), polyether ether ketone (PEEK), poly(ether sulfone) (PES), polycyclic olefin, etc.

Disposed over second surface 106 of first substrate 102 is a first transparent conductive layer 108 made of a transparent conducting material. Examples of transparent conducting materials include, but are not limited to, indium tin oxide (ITO), fluorine doped tin oxide (FTO), antimony doped tin oxide (ATO), aluminum-doped zinc oxide (AZO), zinc oxide (ZnO), conjugated polymers, and a silver nano-wire gird. A first electro-chromic layer 110 is disposed over first transparent conductive layer 108. Preferably, electro-chromic layer 110 is in direct contact with first transparent conductive layer 108. Electro-chromic layer 110 may be a single electro-chromic layer or may be composed of a plurality of electro-chromic layers. For example, electro-chromic layer may include one or more bi-layers such as the bi-layers described in U.S. patent application Ser. No. 14/157,170, filed on Jan. 16, 2014, titled "Solid Electro-chromic Stack Including Electro-chromic Nanoparticles and Methods of Forming the Same Using Layer-by-Layer Deposition." U.S. patent application Ser. No. 14/157,170 is incorporated herein by reference thereto. Electro-chromic layers may further include inorganic nanostructured layers made of $WO_x$, NiO, $Ir_2O_3$, $MoO_2$, layers made of Prussian Blue, layers made of viologens, or layers made of conjugated polymers, such as, but not limited to, polythiophene and its derivatives, polypyrrole, polyaniline, etc.

Figure 7A:
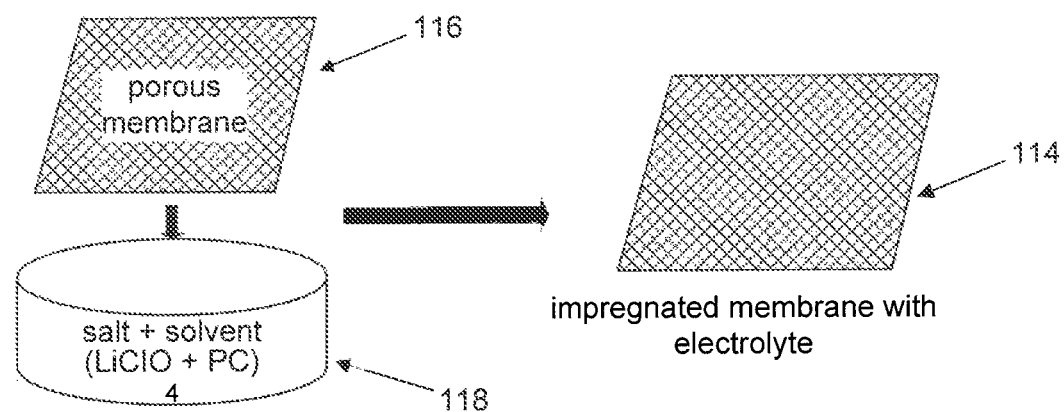
FIGS. 7A and 7B show methods of making electrolytes according to some embodiments.
Figure 7B:
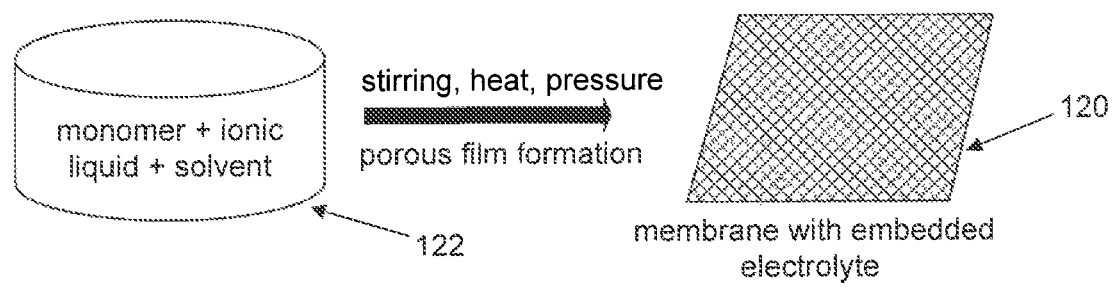

Electrolyte layer 112 is disposed over first electro-chromic layer 110. In some embodiments, as shown in FIG. 7A, electrolyte layer 112 includes a porous membrane 116 that is impregnated with a liquid electrolyte 118 (shown as 114). In some embodiments, as shown in FIG. 7B, electrolyte layer 112 is a porous membrane embedded with an electrolyte (shown as 120). Porous membrane 116 or 120 may be a micro-, meso-, and/or macro-porous membrane. In some embodiments, the porous membrane can be soaked/impregnated/embedded with an appropriate electrolyte before it is inserted in EC device 100 or disposed over an electro-chromic layer. By way of example only, FIGS. 7A and 7B illustrate two possible methods of making an impregnated/embedded membrane prior to its addition to EC device 100. As shown in FIG. 7A, porous membrane 116 can be soaked or impregnated with a liquid electrolyte 118 to produce porous electrolyte layer 114. As shown in FIG. 7B, a mixture 122 may be processed (using for example stirring, heating, and pressurization) to form porous electrolyte layer 120. Mixture 122 can include various ingredients including, but not limited to monomers, ionic liquids (liquid electrolytes), and solvents. In some embodiments, electrolyte layer 112 can be formed in-situ over first electro-chromic layer 110 or a second electro-chromic layer 124 in EC device 100.

Figure 8:
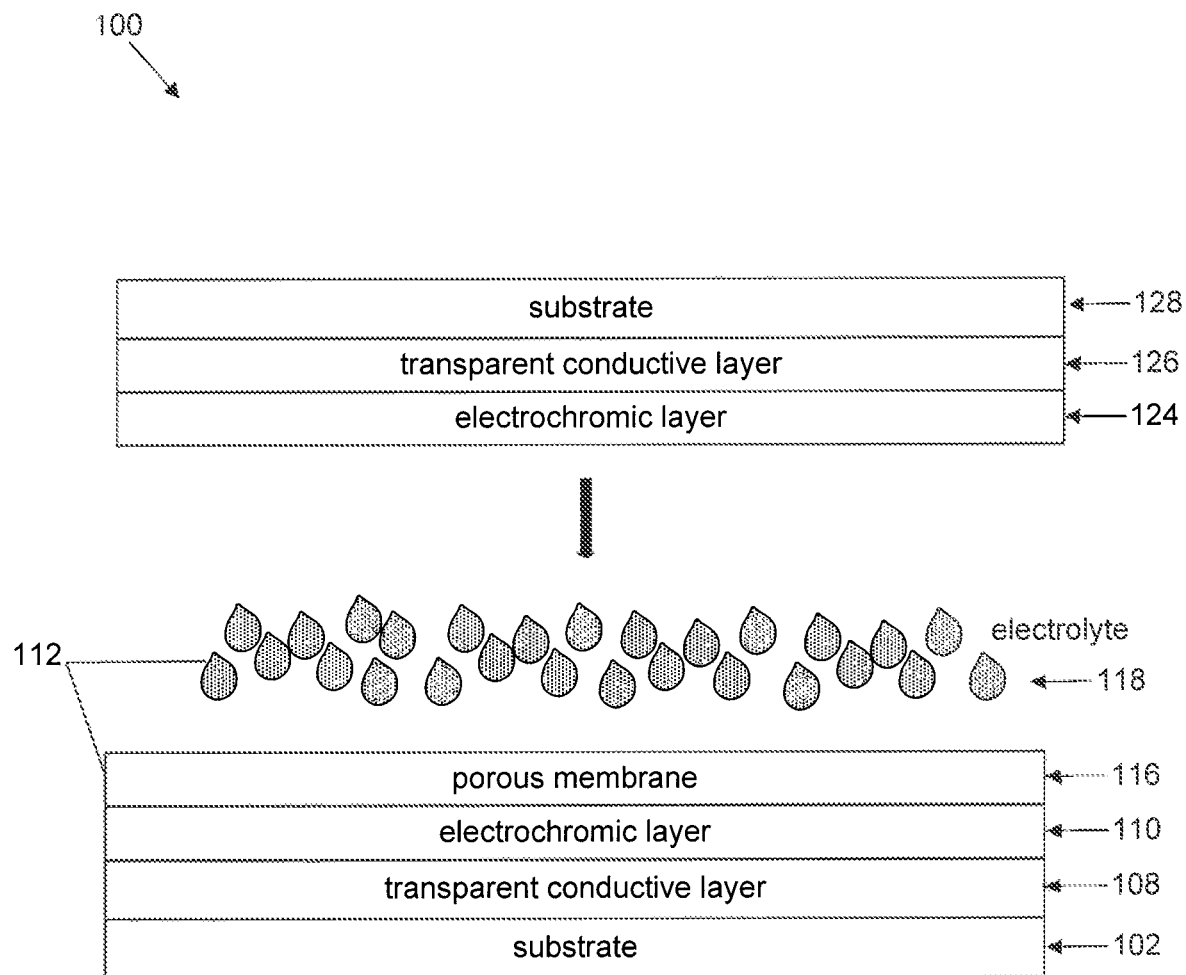
FIG. 8 shows a method of making an electro-chromic device according to one embodiment.

Disposed over electrolyte layer 112 on the side of electrolyte layer 112 opposite first electro-chromic layer 110 are second electro-chromic layer 124, a second transparent conductive layer 126, and a second substrate 128. Second substrate 128 includes a first surface 130 and a second surface 132. While second electro-chromic layer 124 is shown in FIGS. 6 and 8, it will be appreciated that it is optional. In some embodiments, additional layers other than those shown FIGS. 6 and 8, such as protective layers, may be provided.

In some embodiments, porous membrane 116 or 120 can be formed over first electro-chromic layer 110 or second electro-chromic layer 124 in situ using a sol-gel method or spin-coating of appropriate precursor material(s) (e.g. $TiO_2$ paste). For example, as shown in FIG. 8, liquid electrolyte 118 can be added to porous membrane 116 after porous membrane 116 is formed in-situ over first electro-chromic layer 110, thereby forming electrolyte layer 112. In some embodiments, the porous membrane 116 or 120 also serves as the spacer between adjacent layers in the EC device, as well as the insulator.

The porous membranes utilized in disclosed embodiments can be organic, inorganic or hybrid nature. The porous membranes can be made by several methods; some of them include, but are not limited to, sol-gel methods, methods with a template, sintering, polycondensation reaction methods using precursors that yield gaseous products, etc. Exemplary materials for porous membranes include, but are not limited to: $TiO_2$, $ZrO_2$, $ZnO_2$, $SiO_2$, ceramics, various acrylates and methacrylates, urethanes, epoxies, etc, and combinations thereof. Preferably, the porous membrane is optically transparent. Preferably the porous membrane has the same refractive index as the refractive index of the electrolyte that is impregnated or embedded within the membrane. This helps to avoid any light scattering. The membrane pores can be of any size. For example, the membrane pores can be macro-pores (greater than 50 nm), meso-pores (between 2 and 50 nm), micro-pores (smaller than 2 nm), or a combination thereof. Preferably, the pores enable a good flow of the electrolyte through them. Preferably, the membranes have meso- and macro-pores.

Potential liquid electrolytes that can be used in the above embodiments, include, but are not limited to, electrolyte salts, such as $LiClO_4$ in solvent, and ionic liquids. In some embodiments, the porous membrane has the same refractive index as the refractive index of the electrolyte.

Figure 9:
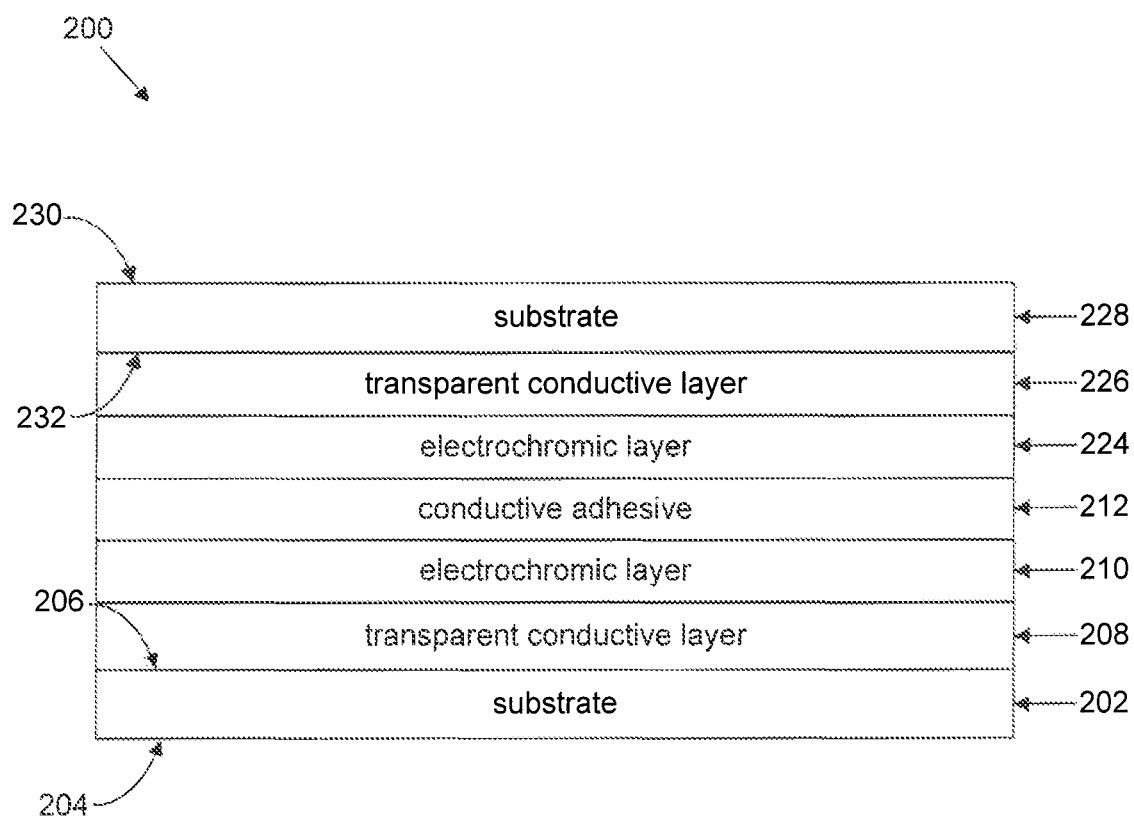
FIG. 9 shows an electro-chromic device according to one embodiment.

FIG. 9 shows an electro-chromic device 200 having an electrolyte layer 212 that is an ion-conductive adhesive according to one embodiment. EC device 200 includes a first substrate 202 having a first surface 204 and a second surface 206. A first electro-chromic layer 210 is disposed over a first transparent conductive layer 208, which is disposed over second surface 206. Electrolyte layer 212 is disposed over first electro-chromic layer 210. Preferably, electrolyte layer 212 is in direct contact with first electro-chromic layer 210. The ion-conductive adhesive of electrolyte layer 212 may be a solid or a quasi-solid electrolyte including a polymer, a hybrid/composite polymer, or a polymer nanocomposite electrolyte as described above. Preferably, the conductive adhesive is transparent.

Disposed over electrolyte layer 212 on the side of electrolyte layer 212 opposite first electro-chromic layer 210 are a second electro-chromic layer 224, a second transparent conductive layer 226, and a second substrate 228. Second substrate 228 includes a first surface 230 and a second surface 232. While second electro-chromic layer 224 is shown in FIG. 9, it will be appreciated that it is optional. In some embodiments, additional layers other than those shown in FIG. 9, such as protective layers, may be provided.

In some embodiments, electrolyte layer 212 may be formed over first electro-chromic layer 210 in situ. For example, a conductive adhesive precursor can be introduced onto first electro-chromic layer 210, and then cured to a final state by UV- or visible light, or by thermal means. In some embodiments, the conductive adhesive is a pressure-sensitive adhesive. In some embodiments, the conductive adhesive or conductive adhesive precursor can be disposed over the first electro-chromic layer 210 layer, and then second electro-chromic layer 224 is brought into contact with the conductive adhesive or precursor and pressed against it, or vice versa. In some embodiments, electrolyte layer 212 may be formed (cured/solidified) before is it disposed over first electro-chromic layer 210 or second electro-chromic layer 224.

Figure 10A:
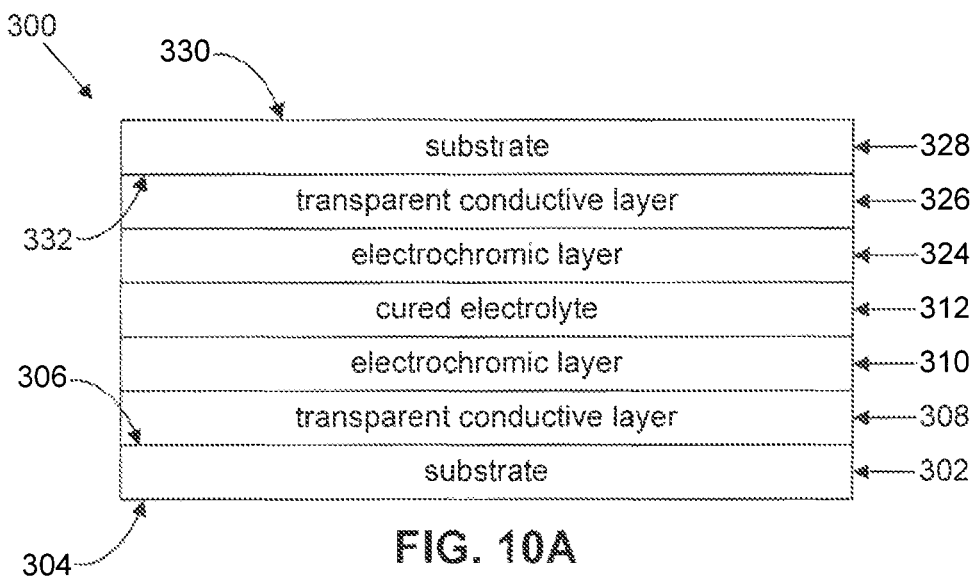
FIG. 10A shows an electro-chromic device according to one embodiment.

FIG. 10A shows an electro-chromic device 300 having an electrolyte layer 312 that is a photo-cured (i.e. UV cured), thermally-cured, or electron beam cured electrolyte. Electro-chromic device 300 includes a first substrate 302 having a first surface 304 and a second surface 306. Disposed over second surface 306 is a first transparent conductive layer 308. Disposed over first transparent conductive layer 308 are a first electro-chromic layer 310 and electrolyte layer 312. The photo-cured (i.e. UV cured), thermally-cured, or electron beam cured electrolyte may be a solid or a quasi-solid electrolyte including a polymer, a hybrid/composite polymer, or a polymer nanocomposite electrolyte as described above. Preferably, electrolyte layer 312 is transparent.

Figure 10B:
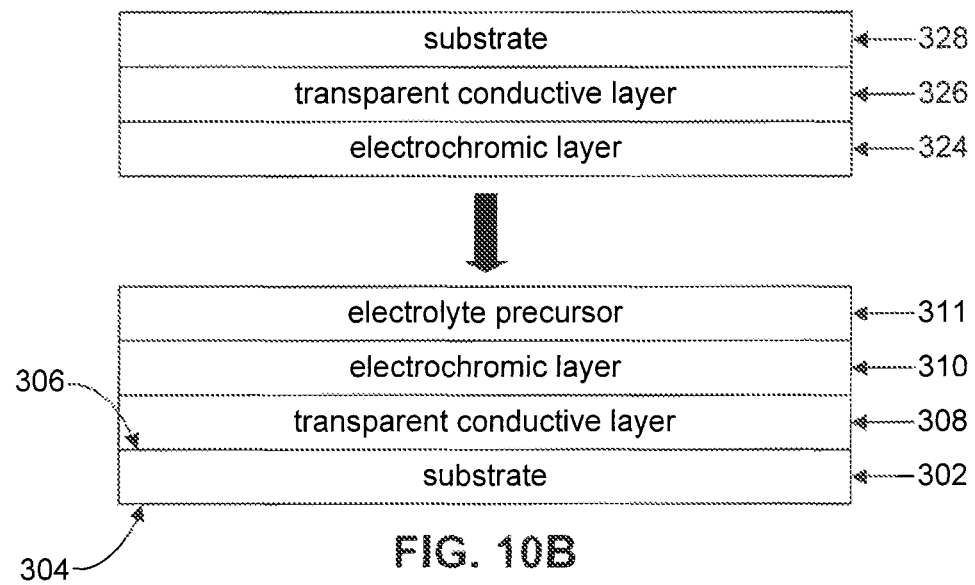
FIGS. 10B and 10C show exemplary methods of making the electro-chromic device in FIG. 10A according to some embodiments.
Figure 10C:
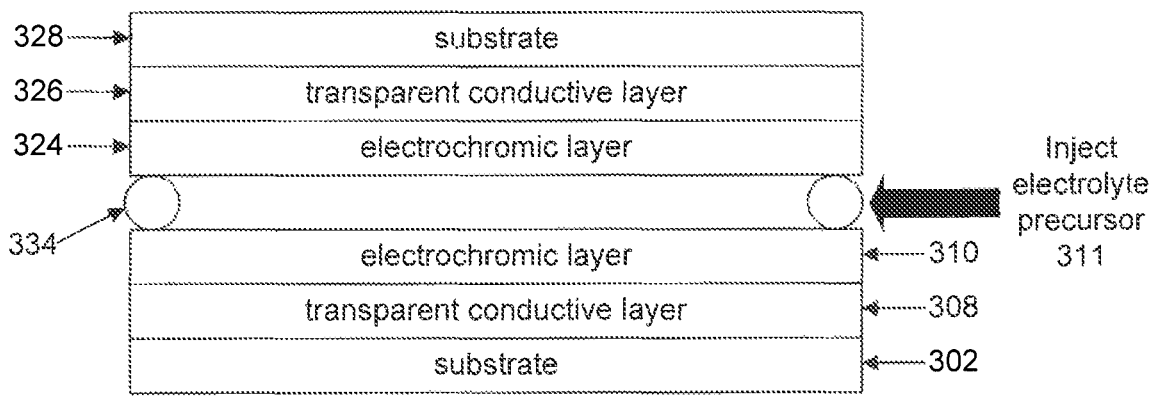

Disposed over electrolyte layer 312 on the side of electrolyte layer 312 opposite first electro-chromic layer 310 are a second electro-chromic layer 324, a second transparent conductive layer 326, and a second substrate 328. Second substrate 328 includes a first surface 330 and a second surface 332. While second electro-chromic layer 324 is shown in FIGS. 10A-C, it will be appreciated that it is optional. In some embodiments, additional layers other than those shown FIGS. 10A-C, such as protective layers, may be provided.

As illustrated in FIGS. 10B and 10C, electrolyte layer 312 may be formed in situ using an electrolyte precursor material 311 to form electro-chromic device 300. Precursor material 311 may be a UV- or thermally-curable formulation of ionic salts/ionic liquids, monomers, oligomers, polymers, and additives (plasticizers, binders, inorganic nanoparticles initiators, inhibitors, viscosity modifiers, ionic liquids, etc.). In some embodiments, precursor material 311 is disposed over first electro-chromic layer 310 in a completely uncured form. In some embodiments, precursor material 311 is disposed over first electro-chromic layer in a partially cured form. After the assembly of the EC device, precursor material 311 is cured to its final state, as shown in FIG. 10A.

FIG. 10B shows a first exemplary embodiment of forming electro-chromic device 300. First, precursor material 311 is disposed over first electro-chromic layer 310. Then second substrate 328, having second transparent conductive layer 326 and second electro-chromic layer 324 disposed thereon, is assembled onto first substrate, thereby forming electro-chromic device 300. Once EC device 300 is assembled, EC device 300 is subjected to a final cure to solidify precursor material 311 into its final state. i.e. form electrolyte layer 312, see FIG. 10A.

FIG. 10C shows a second exemplary embodiment of forming electro-chromic device 300. First, first substrate 302 and second substrate 328 are assembled with a spacer 334 located between them. Spacer 334 provides space for injecting precursor material 311 between first electro-chromic layer 310 and second electro-chromic layer 324 as shown in FIG. 10C. After precursor material 311 is injected, electro-chromic device 300 is subjected to a final cure to solidify precursor material 311 into its final state, i.e. form electrolyte layer 312, see FIG. 10A. Preferably, electrolyte precursor material 311 is introduced in direct contact with the electro-chromic layer(s) as a liquid in order to achieve desirable wetting of the EC layer(s) with electrolyte precursor material 311. Introducing electrolyte precursor material 311 in direct contact with the EC layer(s) in a liquid state and then subjecting it to gradual polymerization increases accessibility of the electrolyte ions to the active sites on the EC layers and provides for optimal interfacial contact.

In some embodiments, the EC layer(s) in an EC device can be "filled" with appropriate ions that enable color-change in the EC device in addition to the ions provided by the used electrolyte. For example, if inorganic layers (WOx, NiO, Ir2O3, or MoO2) are used as EC layers, then ions of alkali metals (Li, K, Na) can cause increased and/or more rapid color-change in these EC layers under an applied voltage. A particular, but non limiting example involves prior lithiation of the inorganic EC layers to provide addition $Li^+$ ions in addition to the $Li^+$ ions provided by $Li^+$-containing electrolyte. In such a case, a thinner electrolyte layer is needed when compared to the electrolyte layer needed for EC devices utilizing EC layers without prior lithiation.

In some embodiments, an EC device may include EC layers "filled" (e.g. via lithiation) with ions and a solid or quasi-solid electrolyte as described herein. In some embodiments, an EC device may include EC layers "filled" (e.g. via lithiation) with ions and a traditional liquid electrolyte. Filling EC layers with ions does not require that a specific type of electrolyte is also present within an EC device.

If the EC layer(s) are applied on flexible substrates, for example, but not limited to, polyester, polycarbonate, and acrylate substrates, the methods discussed herein enable the production of large volume/large area EC devices that can be made, for example, by cost-effective roll-to-roll processes. The solid-state or quasi-solid-state EC devices will further enable easy cutting of the EC device to the desirable shape.

In some of the embodiments, methods for making an EC device of reduced thickness, i.e. on a single substrate are provided. For example, a release agent or release liner can be applied to one of the substrates, which can be easily removed, as shown in FIGS. 11A and 11B.

The electro-chromic device 400 shown in 11B illustrates an EC device 400 having a single substrate 402 according to one embodiment. Device 400 includes substrate 402 having a first surface 404 and a second surface 406. Device 400 also includes a first transparent conductive layer 408 and a first electro-chromic layer 410 disposed over substrate 402, an electrolyte layer 412, a second electro-chromic layer 424, and a second transparent conductive layer 426. In some embodiments, electrolyte layer 412 may be a solid or quasi-solid electrolyte, such as, but not limited to, electrolyte layers 112, 212, and 312 described herein. In some embodiments, electrolyte layer 412 may be a liquid electrolyte.

Figure 11A:
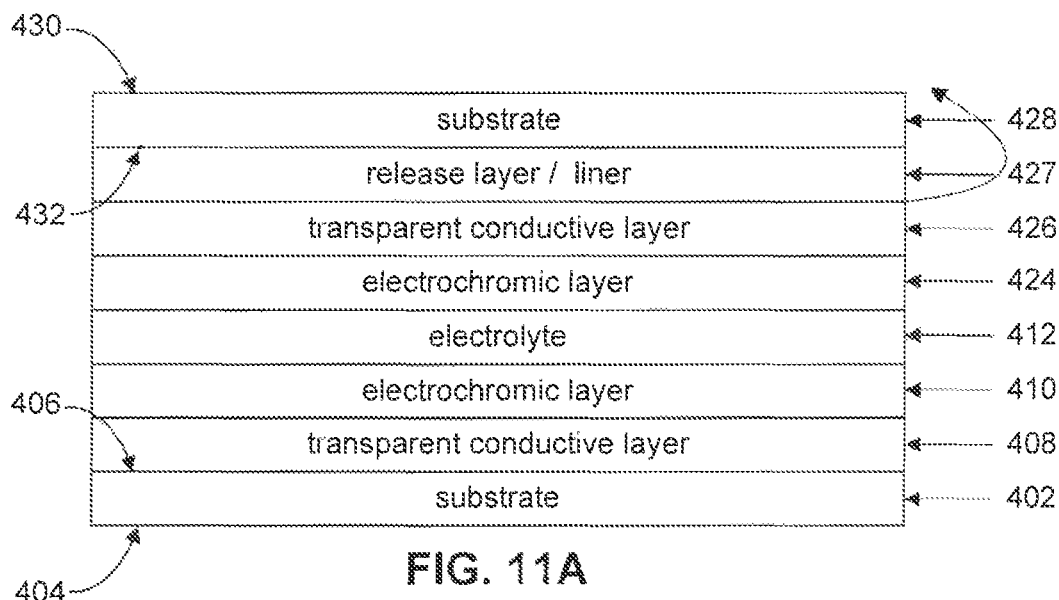
FIGS. 11A and 11B show a method of making an electro-chromic device according to one embodiment.
Figure 11B:
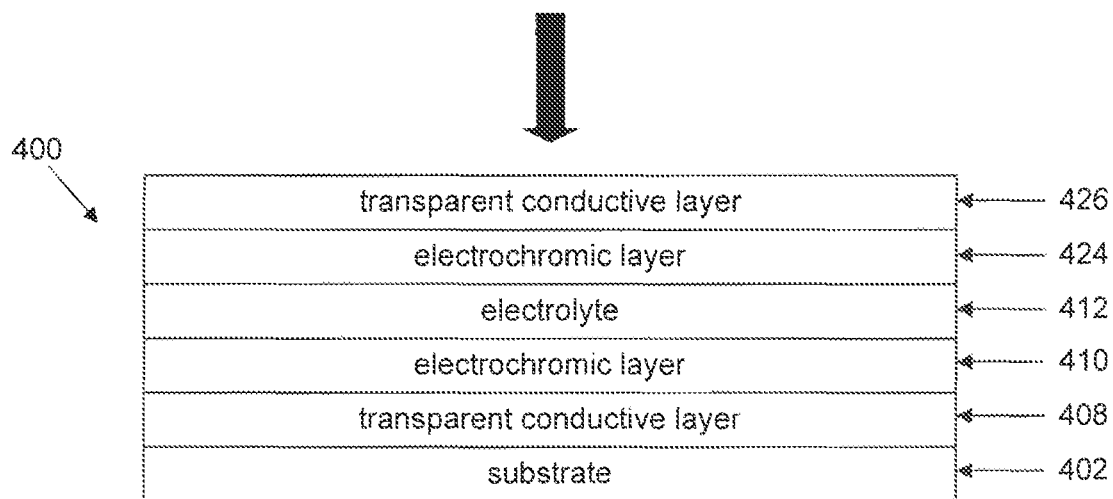

FIGS. 11A and 11B show an exemplary method of fabricating electro-chromic device 400. First, the structure shown in FIG. 11A is fabricated. The structure shown in FIG. 11A may be fabricated using, but not limited to, any of the methods described with reference to FIGS. 6-10C. In contrast to the methods described with reference to FIGS. 6-10C, device 400 is fabricated with a release liner or layer 427. In some embodiments, release liner or layer 427 is applied over a second surface 432 of a removable substrate 428. Removable substrate 428 also includes a first surface 430 exposed to air. After release liner or layer 427 is applied to removable substrate 428, second transparent conductive layer 426 is disposed over release liner or layer 427, and second electro-chromic layer 424 is disposed over second transparent conductive layer 426. While second electro-chromic layer 424 is shown in FIGS. 11A and 11B, it will be appreciated that is it optional. Then electrolyte layer 412 is disposed between first transparent conductive layer 408 and second transparent conductive layer 426. In some embodiments, electrolyte layer 412 is formed in situ over first electro-chromic layer 410 and/or second electro-chromic layer 424 (see, for example, methods described above with reference to FIGS. 6-10C). In some embodiments, electrolyte layer 412 is formed before it is disposed over first electro-chromic layer 410 and/or second electro-chromic layer 424.

After electrolyte layer 412 is disposed between first transparent conductive layer 408 and second transparent conductive layer 424, release liner or layer 427 is removed along with removable substrate 428, thereby forming device 400 as shown in FIG. 11B. In some embodiments, release liner or layer 427 includes a release agent. Release liners may be, but are not limited to, films made of HDPE, LDPE, PVC, PP, PET, or bakery paper Release agents may be, but are not limited to, low surface energy such as, cross-linked silicone, PTFE (Teflon), or wax-based material.

In some embodiments, to protect second transparent conductive layer 426, a scratch-resistant hard coating can be applied to first surface 430. Other coatings, such as a dielectric stack with anti-reflective properties (AR stack) or other anti-reflective coatings, and hydrophobic coatings, can be added depending on the final application of the product. The AR stack may be made of a stack of alternating layers of high refractive index and low refractive index materials (e.g. layers of $TiO_2$ and $SiO_2$). The layers in the AR stack are responsible for creating destructive interference patterns that reduce surface reflections.

Figure 12:
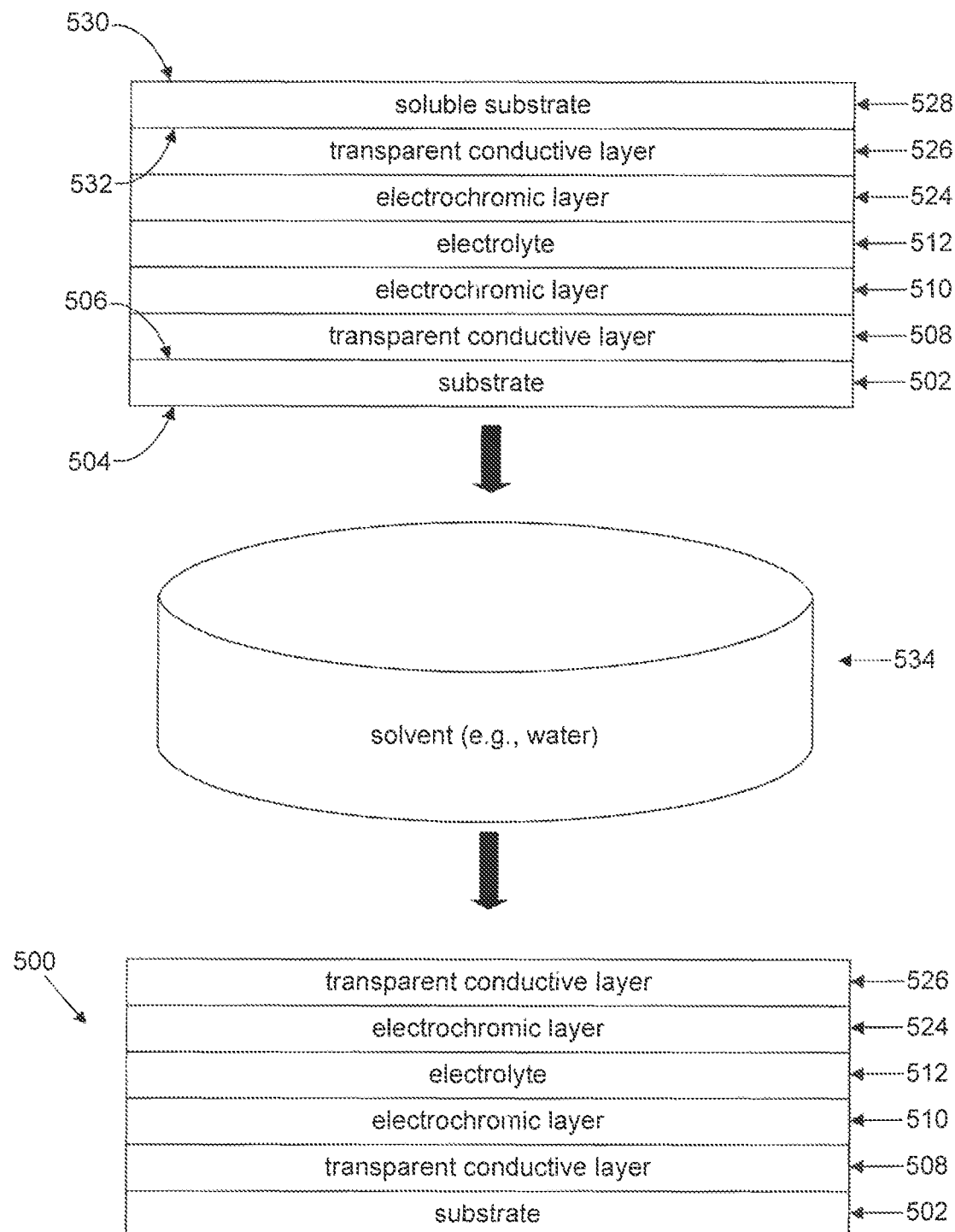
FIG. 12 shows a method of making an electro-chromic device according to one embodiment.

In some embodiments, methods of making an EC device having a single substrate includes using a water- (or other solvent-) soluble substrate. FIG. 12 illustrates a method of making an EC device 500 having a single substrate 502 by dissolving a soluble substrate 528. Device 500 includes substrate 502 having a first surface 504 and a second surface 506. Device 500 also includes a first transparent conductive layer 508 and a first electro-chromic layer 510 disposed over substrate 502, an electrolyte layer 512, a second electro-chromic layer 524, and a second transparent conductive layer 526. In some embodiments, electrolyte layer 512 may be a solid or quasi-solid electrolyte, such as, but not limited to, electrolyte layers 112, 212, and 312 described above. In some embodiments, electrolyte layer 512 may be a liquid electrolyte.

Fabricating device 500 may be accomplished using, but not limited to, any of the methods described with reference to FIGS. 6-10C. In contrast to the methods described with reference to FIGS. 6-10C, device 500 is fabricated with a soluble substrate 528 having a first surface 530 and a second surface 532. In some embodiments, second transparent conductive layer 526 is disposed over second surface 532 of soluble substrate 528. After second transparent conductive layer 526 is disposed soluble substrate 528, and second electro-chromic layer 524 is disposed over second transparent conductive layer 526. While second electro-chromic layer 524 is shown in FIG. 12, it will be appreciated that is it optional. Then electrolyte layer 512 is disposed between first transparent conductive layer 508 and second transparent conductive layer 526. In some embodiments, electrolyte layer 512 is formed in situ over first electro-chromic layer 510 and/or second electro-chromic layer 524 (see, for example, methods described above with reference to FIGS. 6-10C). In some embodiments, electrolyte layer 512 is formed before it is disposed over first electro-chromic layer 510 and/or second electro-chromic layer 524.

After electrolyte layer 512 is disposed between first transparent conductive layer 508 and second transparent conductive layer 524, soluble substrate 528 is dissolved using a solvent 534, thereby forming device 500 as shown in FIG. 12.

Soluble substrate 528 may be made of for example, polyvinyl alcohol (PVA), which can be easily dissolved in water. In some embodiments, to protect second transparent conductive layer 526, a scratch-resistant hard coating can be applied to first surface 530. Other coatings, such as a dielectric stack with anti-reflective properties (AR stack) or other anti-reflective coatings, and hydrophobic coatings, can be added depending on the final application of the product. The AR stack may be made of a stack of alternating layers of high refractive index and low refractive index materials (e.g. layers of $TiO_2$ and $SiO_2$). The layers in the AR stack are responsible for creating destructive interference patterns that reduce surface reflections.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the, hardware, methods and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

The breadth and scope of the invention should not be limited by any of the above-described exemplary embodiments, but should be defined only in accordance with the following claims and their equivalents.

What is claimed is:

1. A device comprising:
   a first transparent conductive layer and a second transparent conductive layer;
   at least one electro-chromic layer disposed between the first transparent conductive layer and the second transparent conductive layer; and
   a solid electrolyte layer, disposed between the first transparent conductive layer and the at least one electro-chromic layer and in contact with the at least one electro-chromic layer, to provide ions to active sites in the at least one electro-chromic layer, the ions causing the at least one electro-chromic layer to change color,
   wherein the solid electrolyte layer comprises a composite material comprising at least three major components, each major component present in a concentration greater than or equal to 10 wt. %;
   wherein at least one of the at least three major components comprises different polymers; and
   wherein the first transparent conductive layer, the at least one electro-chromic layer, the solid electrolyte layer, and the second transparent conductive layer are disposed on a member of the group consisting of a lens blank and a semi-finished lens blank.

2. The device of claim 1, wherein the composite material includes at least two major components selected from the group consisting of polyacrylate, polymethacrylate, polyvinilidene difluoride (PVDF), polyethylene oxide (PEO), polyurethane (PU), polyacrylonitrile (PAN), polyaniline (PANI), polyvinyl chloride (PVC), polyvinyl acetate (PVAc), succinonitrile (SN), acrylate polymers, and methacrylate polymers.

3. The device of claim 1, wherein the composite material includes one of the following combinations of major components: acrylate blend/PVDF-TrFE, acrylate blend/PVDF-HFP, acrylate blend/PU, acrylate blend/PEO, acrylate blend/PVC, acrylate blend/PAN, acrylate blend/PVAc, acrylate blend/PAN, acrylate blend/SN, methacrylate blend/PVDF-TrFE, methacrylate blend/PVDF-HFP, methacrylate blend/PU, methacrylate blend/PAN, methacrylate blend/PEO, methacrylate blend/PVC, methacrylate blend/PVAc, PEO/PAN, PU/PAN, PEO/PU/PAN, acrylate blend/PEO/PVDF-HFP, acrylate blend/SN/PVDF-HFP, a blend of at least two acrylates, a blend of at least two methacrylates, or an acrylate/methacrylate blend.

4. The device of claim 1, wherein the composite material includes one of the following combinations of major components: acrylate blend/PVDF-HFP, acrylate blend/PEO, methacrylate blend/PVDF-HFP, methacrylate blend/PEO, a blend of at least two acrylates, a blend of at least two methacrylates, or an acrylate/methacrylate blend.

5. The device of claim 1, wherein at least one of the at least three major components includes an ionic salt.

6. The device of claim 5, wherein the ionic salt is an ionic salt including a cation selected from the group consisting of Li+, Na+, K+, and H+.

7. The device of claim 1, wherein the solid electrolyte layer has a conductivity greater than $10^{-4}$ S/cm at ambient temperature.

8. The device of claim 1, wherein the solid electrolyte layer has an average transmission of more than 85% in the visible spectral range.

9. The device of claim 1, wherein the composite material comprises at least four major components.

10. The device of claim 1, wherein the composite material comprises at least five major components.

11. The device of claim 1, wherein the at least one of the at least three major components comprises an interpenetrating polymeric network or a semi interpenetrating polymeric network.

12. The device of claim 1, wherein the solid electrolyte layer is a conductive adhesive.

13. The device of claim 12, wherein the conductive adhesive is a heat cured adhesive, a UV cured adhesive, or a pressure-sensitive adhesive.

14. The device of claim 1, wherein the solid electrolyte layer is an optically transparent photo-cured, thermally-cured, or electron beam cured electrolyte.

15. The device of claim 1, wherein the solid electrolyte layer includes at least one of: an ionic salt, an ionic liquid, a plasticizer, an initiator, an inhibitor, a binder, inorganic nanoparticles, or a viscosity modifier.

16. The device of claim 1, wherein the solid electrolyte layer is selected from the group consisting of a conductive transparent adhesive, an optically transparent photo-cured electrolyte, an optically transparent electron-beam-cured electrolyte, and an optically transparent thermally-cured electrolyte.

17. The device of claim 1, wherein the polymer electrolyte includes a PVDF-based polymer or copolymer added to an acrylate/methacrylate polymer blend.

18. The device of claim 1, wherein the polymer electrolyte is a mixing of different polymer and/or copolymer materials.

19. The device of claim 1, wherein the at least one electro-chromic layer comprises:
   a first electro-chromic layer disposed between the first transparent conductive layer and the solid electrolyte layer; and
   a second electro-chromic conductive layer disposed between the solid or electrolyte layer and the second transparent conductive layer.

20. The device of claim 1, wherein the solid electrolyte layer is a composite material that provides a switching time under 5 seconds.

21. The device of claim 1, wherein the first transparent conductive layer, at least one electro-chromic layer, solid electrolyte layer, and second transparent conductive layer are disposed on the semi-finished lens blank and are configured to survive edging of the semi-finished lens blank.

22. A method comprising:
   providing a first substrate having a first conductive layer and a second substrate having a second conductive layer, wherein the first substrate is a member of the group consisting of a lens blank and a semi-finished lens blank;
   disposing at least one electro-chromic layer over the first conductive layer;
   forming a solid electrolyte layer in situ over the at least one electro-chromic layer, the solid electrolyte being a composite material comprising at least three major components, each major component present in a concentration greater than or equal to 10 wt %;
   wherein the in-situ formation includes disposing one or more precursor materials over the at least one electro-chromic layer;
   wherein the solid electrolyte comprises different polymers; and
   assembling the first substrate and the second substrate.

* * * * *